US012289579B2

(12) United States Patent
Iwakura

(10) Patent No.: US 12,289,579 B2
(45) Date of Patent: Apr. 29, 2025

(54) ELECTROMECHANICAL TRANSDUCER

(71) Applicant: RION CO., LTD., Tokyo (JP)

(72) Inventor: Takashi Iwakura, Kokubunji (JP)

(73) Assignee: RION CO., LTD., Tokyo (JP)

( * ) Notice: Subject to any disclaimer, the term of this patent is extended or adjusted under 35 U.S.C. 154(b) by 176 days.

(21) Appl. No.: 18/025,724

(22) PCT Filed: Sep. 6, 2021

(86) PCT No.: PCT/JP2021/032719
§ 371 (c)(1),
(2) Date: Mar. 10, 2023

(87) PCT Pub. No.: WO2022/054769
PCT Pub. Date: Mar. 17, 2022

(65) Prior Publication Data
US 2023/0370782 A1 Nov. 16, 2023

(30) Foreign Application Priority Data
Sep. 11, 2020 (JP) ................................ 2020-152715

(51) Int. Cl.
*H04R 11/02* (2006.01)

(52) U.S. Cl.
CPC .................................. *H04R 11/02* (2013.01)

(58) Field of Classification Search
CPC ................................ H04R 11/02; H02K 33/00
See application file for complete search history.

(56) References Cited

U.S. PATENT DOCUMENTS

2015/0207392 A1* 7/2015 Iwakura ................. H02K 33/00 310/25
2018/0310101 A1* 10/2018 Iwakura ................. H04R 11/00
2021/0235199 A1 7/2021 Iwakura

FOREIGN PATENT DOCUMENTS

JP 2015-139041 A 7/2015
JP 2018-186378 A 11/2018
JP 2019-193218 A 10/2019
JP 2020-015009 A 1/2020

OTHER PUBLICATIONS

China National Intellectual Property Administration, Notification of the First Office Action, Application No. 202180061887.3, dated May 24, 2024, in 14 pages.
Patent Cooperation Treaty, International Search Report, Application No. PCT/JP2021/032719, dated Nov. 9, 2021, in 5 pages.
(Continued)

*Primary Examiner* — Sunita Joshi
(74) *Attorney, Agent, or Firm* — PROCOPIO, CORY, HARGREAVES & SAVITCH LLP

(57) ABSTRACT

This electromechanical transducer includes a pair of magnets, a pair of yokes that each comprise a plurality of yoke components superposed over each other in a flat-plate-form region and that guide magnetic fluxes generated by the magnets, a hollow-core coil to which an electric signal is supplied, an armature passed through a space inside a structural section formed by integrally arranging the magnets and the coil on the inner sides of the pair of yokes, and a pair of elastic members that each engage the structural section and the armature.

1 Claim, 14 Drawing Sheets

(56) References Cited

OTHER PUBLICATIONS

Patent Cooperation Treaty, WOSA, Application No. PCT/JP2021/032719, dated Nov. 9, 2021, in 3 pages.
Japanese Patent Office, Office Action, Application No. 2020-152715, dated Dec. 10, 2024, in 9 pages.
Japanese Patent Office, Office Action, Application No. 2020-152715, dated Oct. 1, 2024, in 7 pages.

* cited by examiner

ELECTROMECHANICAL TRANSDUCER

TECHNICAL FIELD

The present invention relates to an electromechanical transducer that converts electric signals into mechanical vibration, and more particularly, to an electromechanical transducer having a structure utilizing a restoring force of a spring engaged with an armature among so-called balanced armature structures.

BACKGROUND ART

In this type of electromechanical transducer, a spring is disposed between a structural portion in which a yoke, a magnet, and a coil are integrally disposed and an armature passing through an internal space of the structural portion to constitute a drive unit. The armature is displaced within a certain range by a balance between a magnetic force of the magnet acting on the armature when a current flows through the coil and a restoring force of the spring, whereby the drive unit causes relative vibration between the armature and the structural portion. For example, an electromechanical transducer provided with two pairs of springs between a structural portion and an armature (see Patent Literature 1) and an electromechanical transducer provided with one pair of springs (see Patent Literature 2) are known.

CITATION LIST

Patent Literature

Patent Literature 1: JP2015-139041A
Patent Literature 2: JP2018-186378A

SUMMARY OF INVENTION

Technical Problem

The yoke constituting a part of the structural portion is formed of a soft magnetic material, and has a role of guiding magnetic fluxes generated by the magnet. The soft magnetic material has a predetermined saturation magnetic flux density as a characteristic thereof. When the saturation magnetic flux density is exceeded, magnetic fluxes saturate to reach a peak state, and the soft magnetic material would not play a role as a yoke. Therefore, it is necessary to design a cross-sectional area of the yoke with a size within a range in which the magnetic fluxes would not saturate.

The related art described above has a structure in which an armature is sandwiched by two yokes from two sides via springs, and the yokes are joined and fixed. That is, the yokes in the related art have, in addition to a role of guiding magnetic fluxes (a role at the time of use), a role of positioning the armature via springs and a role of completing a drive unit by fixing the two yokes (roles at the time of manufacturing).

In general, when a plate material is processed to produce a component, a minimum width for punching or bending naturally increases as a thickness of the plate material increases. In view of the role at the time of use, the yoke in the related art needs to have such a thickness that a cross-sectional area of a portion through which magnetic fluxes pass can be ensured with a desired size. However, when the yoke is designed by bending a plate material having such a thickness and further having the roles at the time of manufacturing, it may be difficult to manufacture the yoke due to a shape of the portion, or a dimension of a portion to be bent may be larger than necessary, and as a result, a dimension of an entire electromechanical transducer may be larger.

The present invention is made in view of such problems, and an object of the present invention is to provide a technique of reducing a size of an electromechanical transducer while mitigating difficulties in manufacturing components of the electromechanical transducer.

Solution to Problem

In order to solve the above problems, the present invention employs the following electromechanical transducer. Phrases in the following parentheses are merely examples, descriptions, specific expressions, and the like, and the present invention is not limited thereto.

An electromechanical transducer according to the present invention includes: a pair of magnets; a pair of yokes, each of which includes plural yoke components that are overlapped with each other at flat plate-shaped portions thereof, the yokes configured to guide magnetic fluxes generated by the magnets; an air core coil to which an electric signal is supplied; an armature passing through an internal space of a structural portion in which the magnets and the coil are integrally disposed inside the yokes; and a pair of elastic members, each of which is engaged with the structural portion and the armature.

In the electromechanical transducer according to this aspect, each yoke is configured by overlapping plural yoke components each having a flat portion, and a predetermined cross-sectional area by which magnetic fluxes passing through the yoke would not saturate is ensured by a sum of thicknesses of the plural flat portions. Since each of the yoke components is constituted by a plate material that is thinner than the yoke, manufacturing is easier when bending the plate material to form other portions than when bending a plate material having the same thickness as that of the yoke, and a protruding dimension due to bending is limited to a small value. Therefore, according to the electromechanical transducer of this aspect, the yoke can be made smaller without having magnetic fluxes saturated while mitigating difficulties in manufacturing, and it is possible to contribute to downsizing of the electromechanical transducer.

Preferably, in the above-described electromechanical transducer, the yoke includes, on one of the yoke components, bent portions protruding from respective symmetrical positions of two side surfaces thereof in a predetermined second direction orthogonal to a first direction that is an overlapping direction of the yoke components, bend into the first direction, and extend by a predetermined length. The yokes are fixed to each other on end surfaces of the bent portions.

In the electromechanical transducer according to this aspect, one of the yoke components includes the bent portions. The bent portion is formed by bending a plate material constituting the yoke component and the plate material is thinner than the yoke. Accordingly, the plate material is easily bent as compared with a plate material having the same thickness as that of the yoke, and the protruding dimension due to bending is limited to a small value. Therefore, according to the electromechanical transducer of this aspect, it is possible to reduce the size of the electromechanical transducer while mitigating difficulties in manufacturing components.

More preferably, in the electromechanical transducer described above, each yoke includes engagement portions protruding from predetermined positions on two side surfaces of the yoke component disposed on an outer side of the structural portion in a direction orthogonal to the first direction. The elastic members are engaged with the engagement portions.

According to the electromechanical transducer of this aspect, portions that are engaged with the elastic members are provided on the yoke component disposed on the outer side when the yoke is integrated as a part of the structural portion. For this reason, lengths of the elastic members can be made larger than in a case where the portions are provided on the yoke component disposed on an inner side of the structural portion, and a predetermined displacement amount by which the elastic member can be displaced in the first direction can be ensured.

Advantageous Effects of Invention

As described above, according to the present invention, it is possible to reduce a size of an electromechanical transducer while mitigating difficulties in manufacturing components of the electromechanical transducer.

DESCRIPTION OF EMBODIMENTS

Hereinafter, embodiments of the present invention will be described with reference to the drawings. The following embodiments are preferred examples, and the present invention is not limited to these examples. For convenience of description, directions related to configurations may be indicated as upper, lower, left, and right directions along directions on a paper surface of each drawing.

First Embodiment

Figure 1:
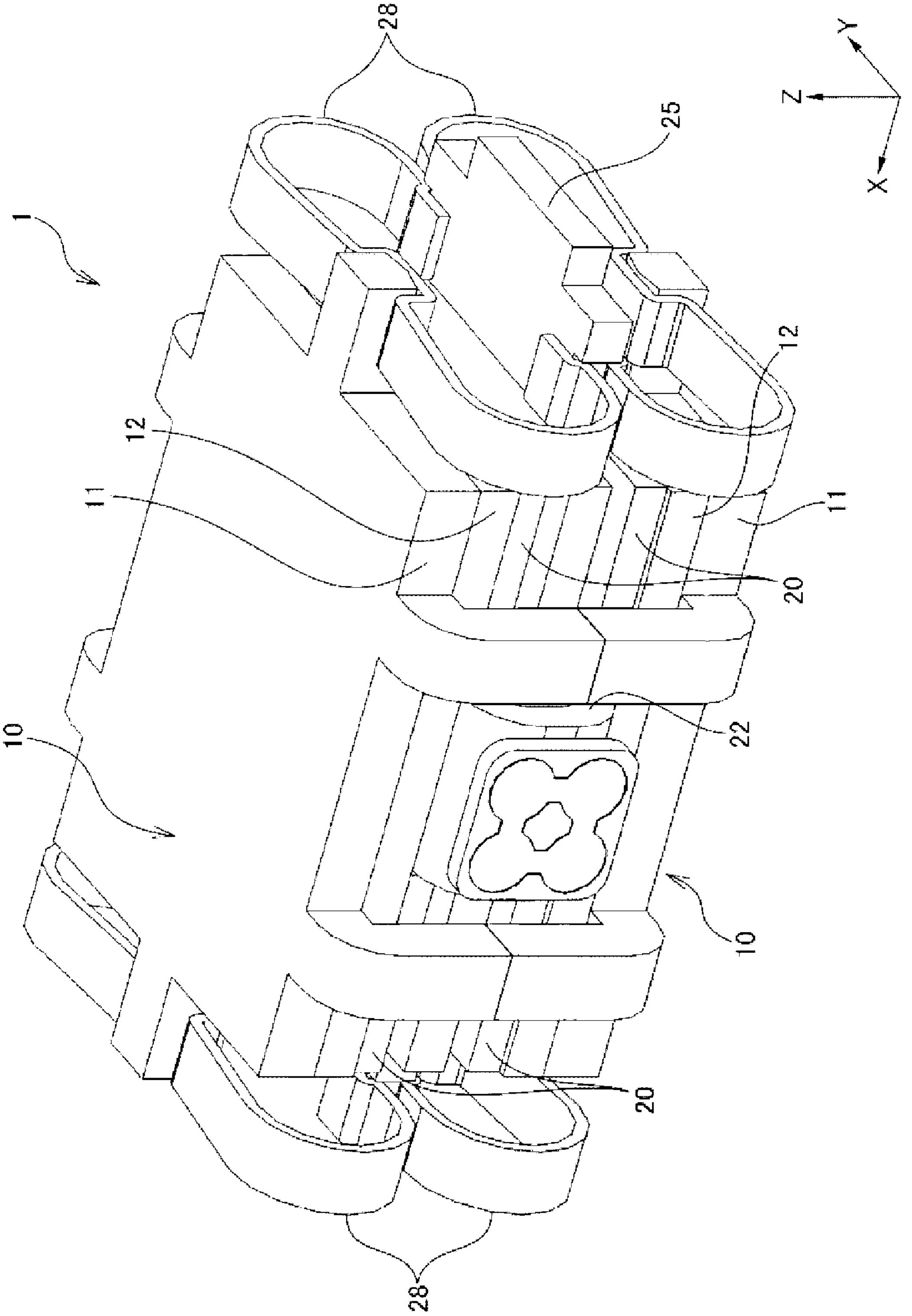
FIG. 1 is a perspective view showing a drive unit of an electromechanical transducer according to a first embodiment.

FIG. 1 is a perspective view showing a drive unit (a drive unit 1) of an electromechanical transducer according to a first embodiment. The drive unit 1 includes a pair of (two) yokes 10, two pairs of (four) magnets 20, a coil 22, an armature 25, and two pairs of (four) springs 28.

Each yoke 10 includes an outer yoke 11 constituting an outer portion and an inner yoke 12 constituting an inner portion, and is disposed vertically with the outer yoke 11 being an outer side. The coil 22 is fixed to inner sides and central portions in a left-right direction of the pair of vertically disposed yokes 10 (more precisely, the inner yokes 12). The magnets 20 are paired vertically, and the two pairs of magnets 20 are fixed to the inner sides and left and right end portions of the pair of yokes 10 (more precisely, the inner yokes 12). The yokes 10, the magnets 20, and the coil 22, which are integrally disposed in this way, constitute a structural portion.

The armature 25 passes through an internal space of the structural portion. The springs 28 are paired vertically, and the two pairs of springs 28 are disposed between the structural portion (more precisely, the outer yokes 11) and the armature 25 passing through the internal space of the structural portion at left and right end portions. Further, the end portions of the pair of yokes 10 (more precisely, the outer yokes 11) are fixed to each other, and the armature 25 and the springs 28 are added to the structural portion to constitute the drive unit 1.

The two pairs of magnets 20 are magnetized in directions opposite to each other. For example, the pair of magnets 20 disposed on a right side are magnetized downward, and the pair of magnets 20 disposed on a left side are magnetized upward. For this reason, when a current flows through the coil 22 (electric signals are supplied), magnetic fluxes in opposite directions are generated in regions on two sides of the armature 25 in the left-right direction, and these magnetic fluxes are guided in a closed circuit shape by the pair of yokes, and the structural portion (the yokes 10, the magnets 20, the coil 22) and the armature 25 constitute a magnetic circuit. When the armature 25 is displaced by magnetic forces of the magnets 20, restoring forces of the springs 28 corresponding to the displacement act on the armature 25, and relative vibration occurs between the structural portion and the armature.

A configuration of the yoke 10 and a connection relationship between components constituting the drive unit 1 will be described in detail below with reference to other drawings. In the following description, a direction in which the two pairs of magnets 20 sandwich the coil 22 is referred to as an "X direction", a direction in which the pair of springs 28 sandwich the armature 25 is referred to as a "Z direction", and a direction orthogonal to both the X direction and the Z direction is referred to as a “Y direction”.

Figure 2:
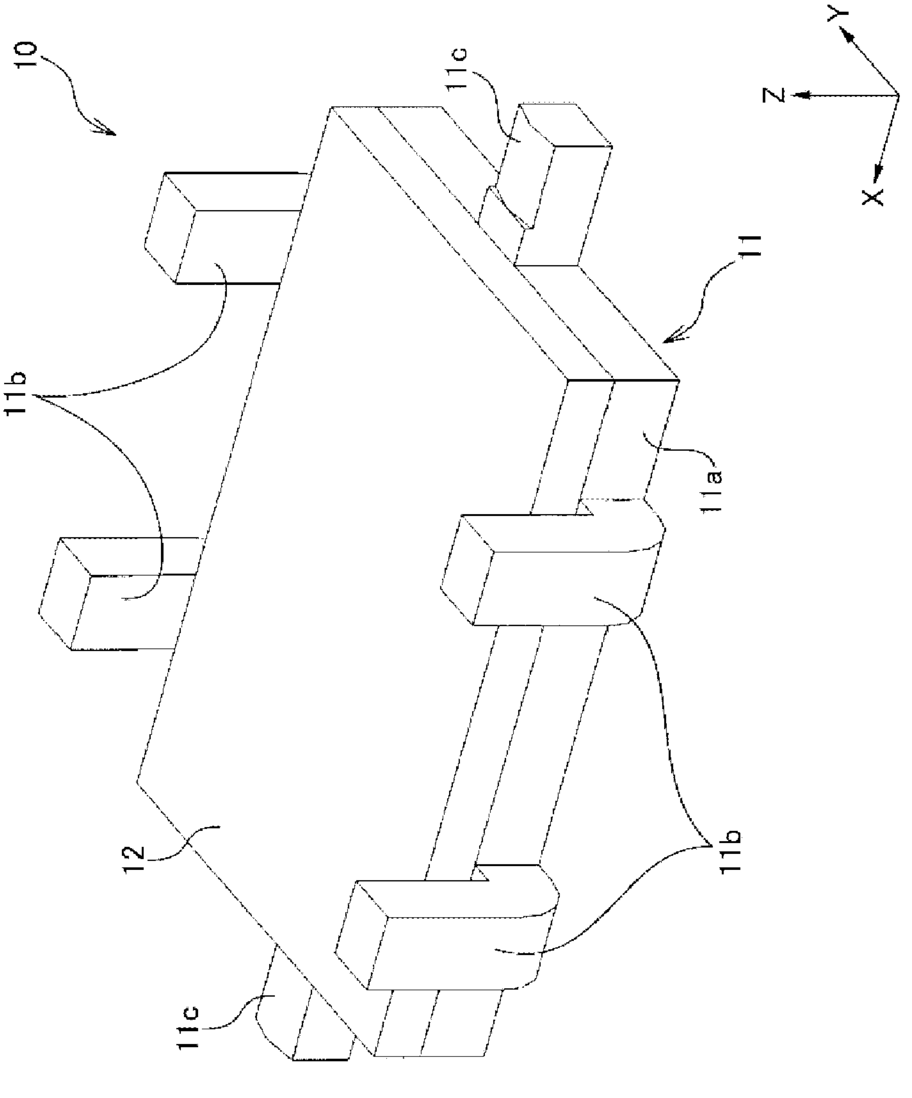
FIG. 2 is a perspective view showing a yoke of the electromechanical transducer according to the first embodiment.

FIG. 2 is a perspective view showing the yoke 10. As described above, the yoke 10 includes the outer yoke 11 and the inner yoke 12, which are pressed against each other and fixed by laser welding or the like. The outer yoke 11 and the inner yoke 12 are formed of, for example, a soft magnetic material such as permalloy of 45% Ni.

The outer yoke 11 includes a magnetic flux passage portion 11*a* through which magnetic fluxes pass, bent portions 11*b* having end surfaces that fix the pair of yokes 10, and spring engagement portions 11*c* that are engaged with the springs 28. The magnetic flux passage portion 11*a* is a flat rectangular portion. The bent portion 11*b* is a portion formed by bending a plate material constituting the magnetic flux passage portion 11*a*, and is provided at two locations on each of two sides of the magnetic flux passage portion 11*a* in the Y direction. The bent portion 11*b* protrudes from two side surfaces of the magnetic flux passage portion 11*a* in the Y direction, bends into the Z direction, and extends by the same length. The spring engagement portion 11*c* is provided at one location on each of two sides of the magnetic flux passage portion 11*a* in the X direction, and a surface that is engaged with the spring 28 has a shape that can limit a torque of a force acting on the spring 28 to a small one.

The inner yoke 12 is a flat rectangular portion whose shape in an XY plane is substantially the same as that of the magnetic flux passage portion 11*a* of the outer yoke. The inner yoke 12 is overlapped with the magnetic flux passage portion 11*a*, and is integrated with the magnetic flux passage portion 11*a* to allow magnetic fluxes to pass therethrough. Magnetic fluxes guided from the magnet 20 to the yoke 10 pass in the X direction, and thus a cross-sectional area of the magnetic flux passage portion 11*a* and the inner yoke 12 in a YZ plane is designed with a predetermined size at which the magnetic fluxes would not saturate. Here, a dimension in the Y direction is restricted according to the design of the entire drive unit 1 (electromechanical transducer). Accordingly, to make the cross-sectional areas a predetermined size, it is necessary to adjust a dimension in the Z direction, that is, thicknesses of the magnetic flux passage portion 11*a* and the inner yoke 12 to ensure a predetermined thickness of the entire yoke 10. On the other hand, a repulsive force of the spring 28 acts on the spring engagement portion 11*c* at all times and thus the repulsive force of the spring 28 is also transmitted to an end portion of the bent portion 11*b* fixed by laser welding or the like at all times. Accordingly, it is necessary to ensure a desired strength for each of these portions.

Therefore, in the present embodiment, the thickness of the magnetic flux passage portion 11*a* is made small within a range in which the spring engagement portion 11*c* can have a desired strength, and the thickness of the inner yoke 12 compensates for a shortfall in the predetermined thickness. Accordingly, a protruding dimension of the yoke 10 in the Y direction generated by bending the bent portion 11*b* can be limited to a small value while ensuring the predetermined thickness of the entire yoke 10 and ensuring a sufficient strength for each of the spring engagement portion 11*c* and the bent portion 11*b*.

Figure 3:
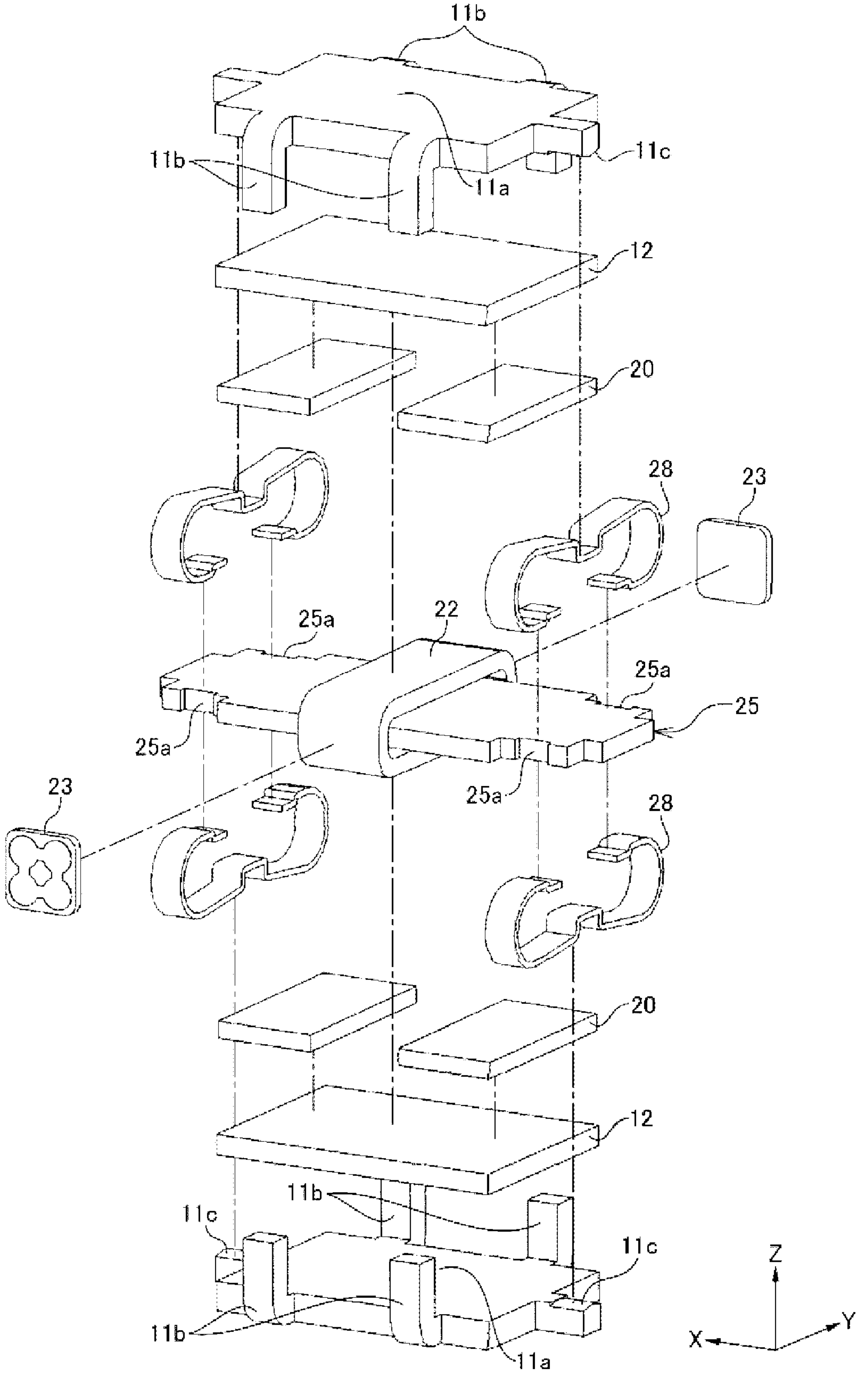
FIG. 3 is an exploded perspective view showing the drive unit of the electromechanical transducer according to the first embodiment.

FIG. 3 is an exploded perspective view showing the drive unit 1. In FIG. 3, to improve the visibility of the drawing and promote understanding of the invention, alternate long and short dash lines indicating the connection between the magnetic flux passage portion 11*a* of the outer yoke and the inner yoke 12 and the connection between the bent portions 11*b* of the outer yokes disposed at two ends in the Z direction are omitted.

The magnetic flux passage portion 11*a* of the outer yoke 11 and the inner yoke 12 are pressed against each other and fixed by laser welding or the like. The magnets 20 are adhesively fixed to two end portions of the inner yoke 12 in the X direction, respectively, and the air core coil 22 is adhesively fixed to a central portion of the inner yoke 12 in the X direction. Coil terminals 23 are adhesively fixed to two respective end portions of the coil 22 in the Y direction, and a winding start and a winding end of coil winding are soldered to the coil terminals 23, respectively.

The armature 25 passes through a hole passing in the X direction through the coil 22 constituting a part of the structural portion. The armature 25 is formed of, for example, a soft magnetic material such as permalloy of 45% Ni similarly to the outer yoke 11 and the inner yoke 12, and is formed with spring engagement portions 25*a* cut out in a concave shape at two respective end portions in the Y direction slightly inside two ends in the X direction. The spring 28 is formed by bending a plate-shaped member using a stainless steel material such as a spring material SUS301. One of the two pairs of springs 28 that are paired in the Z direction are disposed between the outer yokes 11 and the armature 25 at one end portion (for example, the right side) in the X direction and are engaged with the spring engagement portions 11*c* and 25*a* of the outer yokes 11 and the armature 25, and the other pair of springs 28 are disposed between the outer yokes 11 and the armature 25 at the other end portion (for example, the left side) in the X direction and are engaged with the spring engagement portions 11*c* and 25*a* of the outer yokes 11 and the armature 25. Finally, when the four bent portions 11*b* provided on each of the outer yokes 11 disposed at two ends in the Z direction are pressed against each other and fixed by laser welding or the like, the drive unit 1 is completed.

In the drive unit 1, two pairs of springs 28 are sandwiched between the outer yokes 11 and the armature 25 with a predetermined displacement amount in the Z direction. The armature 25 receives repulsive forces from the springs 28 that are paired in the Z direction, and is held in a position where the repulsive forces are balanced with each other with an appropriate gap between the armature 25 and the structural portion. The spring engagement portion 11*c* is provided in the outer yoke 11, and thus a length of the plate-shaped member required for the spring 28 can be increased as compared with a case where the spring engagement portion is provided in the inner yoke, and a predetermined displacement amount by which the spring 28 can be displaced in the Z direction can be ensured.

The drive unit 1 is housed in a housing (not shown). When two end portions of the armature 25 are fixed to the housing and wires (not shown) extending from the coil terminals 23 are connected to electric terminals provided in the housing, an electromechanical transducer is completed. The electromechanical transducer is used as a vibrator. For example, if the present invention is applied to a cartilage conduction hearing aid to be worn in a concha cavity of a user, vibration generated by the electromechanical transducer can be transmitted to cartilage through the housing. This configuration is merely an example of the electromechanical transducer including the drive unit 1, and the drive unit 1 may be housed in the housing together with additional components depending on the application of the electromechanical transducer. Alternatively, the drive unit 1 may be used without being accommodated in the housing.

Figure 4A:
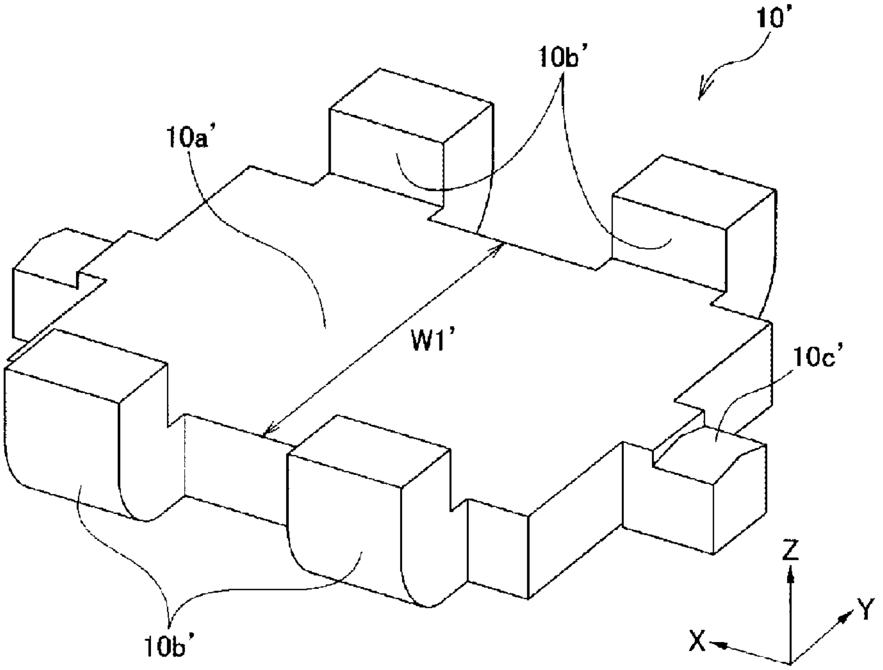
FIG. 4A shows the first embodiment in comparison with a comparative example.
Figure 4B:
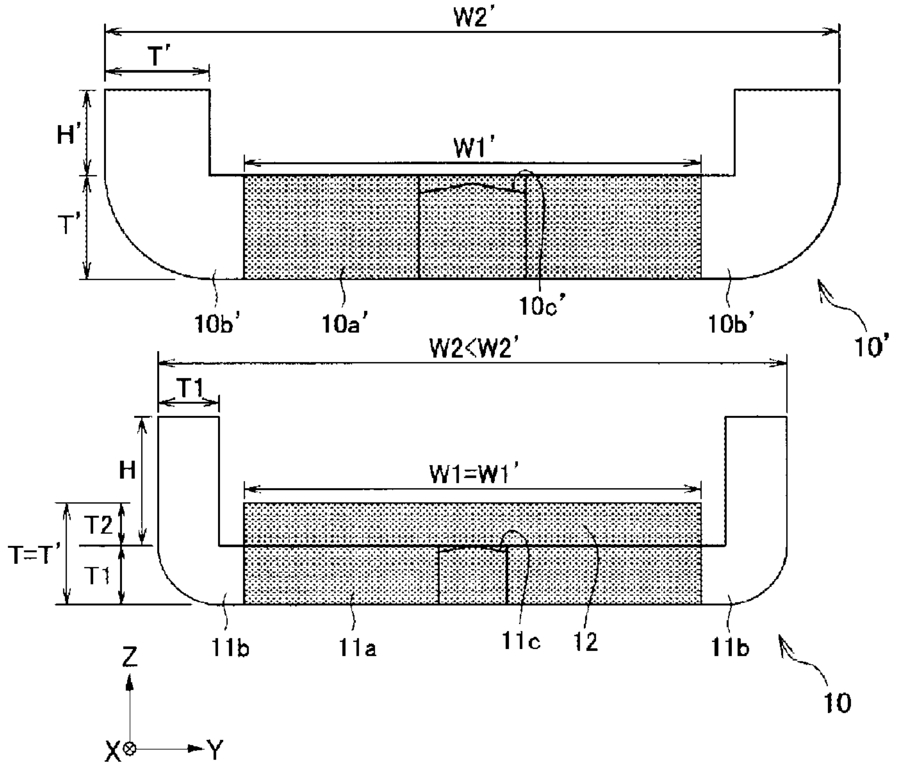
FIG. 4B shows the first embodiment in comparison with the comparative example.

FIGS. 4A and 4B show the first embodiment in comparison with a comparative example. FIG. 4A is a perspective view showing a yoke 10' of an electromechanical transducer as the comparative example, and FIG. 4B is a side view showing the yoke 10' side by side with the yoke 10 of the first embodiment.

The yoke 10' of the comparative example is intended to ensure a thickness of a magnetic flux passage portion with one component, which is ensured by adding thicknesses of two yoke components (the outer yoke 11, the inner yoke 12) in the yoke 10 of the embodiment. For this reason, the yoke 10' is formed by processing a plate material having a predetermined thickness T', a bent portion 10*b*' is provided at two locations on each of two sides of a magnetic flux passage portion 10*a*' in the Y direction, and a spring engagement portion 10*c*' is provided at one location on each of two sides of the magnetic flux passage portion 10*a*' in the X direction.

Since the bent portion 10*b*' is formed by bending the plate material having the thickness T', a dimension in the Y direction at a top portion thereof is equal to the thickness T'. Therefore, although a large strength is ensured in the bent portion 10*b*', such a strength is not necessary. Although a height H' of a portion of the bent portion 10*b*' that protrudes upward from the magnetic flux passage portion 10*a*' is designed with a smaller value than the thickness T', it is fairly difficult to form such a shape. A protruding dimension W2' of the yoke 10' in the Y direction is a size obtained by adding a dimension required for bending the thickness T' to a dimension W1' of the magnetic flux passage portion 10*a*' in the Y direction.

In contrast, in the yoke 10 of the first embodiment, the inner yoke 12 having a thickness T2 is fixed to the magnetic flux passage portion 11*a* of the outer yoke constituted by a plate material having a thickness T1 that can impart a desired strength to the spring engagement portion 11*c*, and the thickness of the inner yoke 12 compensates for a shortfall in the thickness. According to the yoke 10, a protruding dimension W2 in the Y direction can be limited to a smaller value by an amount corresponding to a reduction in the thickness T1 of the plate material to be bent ($W2<W2'$) while ensuring a cross-sectional area (a shaded portion in the drawing) of a portion through which magnetic fluxes pass with the same size as that of the yoke 10' of the comparative example ($W1\times T=W1'\times T'$) and ensuring a sufficient strength for each of the spring engagement portion 11*c* and the bent portion 11*b*. In addition, a height H of a portion of the bent portion 11*b* that protrudes upward from the magnetic flux passage portion 11*a* can be easily designed with a larger value than the thickness T1 of the plate material to be bent, and the bent portion 11*b* can be easily formed. Therefore, according to the first embodiment, the size of the drive unit and accordingly the size of the electromechanical transducer can be reduced as a whole while mitigating difficulties in manufacturing components.

To facilitate understanding of the invention, the description is made on an assumption that a width and a thickness of a cross section of a magnetic flux passage portion are the same between the embodiment and the comparative example ($W1=W1'$, $T=T'$). Based on the design of the entire drive unit 1 (the electromechanical transducer), even if the width and the height in the embodiment are changed to be different from those in the comparative example (for example, the thickness is slightly larger than T, and the width is adjusted accordingly to be slightly smaller than W1), the same cross-sectional area can be ensured. The yoke 10 of the first embodiment includes two yoke components (the outer yoke 11, the inner yoke 12), and the number of yoke components constituting the yoke is not limited to two. For example, the inner yoke having no bent portion may include two or more yoke components formed of a soft magnetic material, and a yoke may include a total of three or more yoke components.

Second Embodiment

Figure 5:
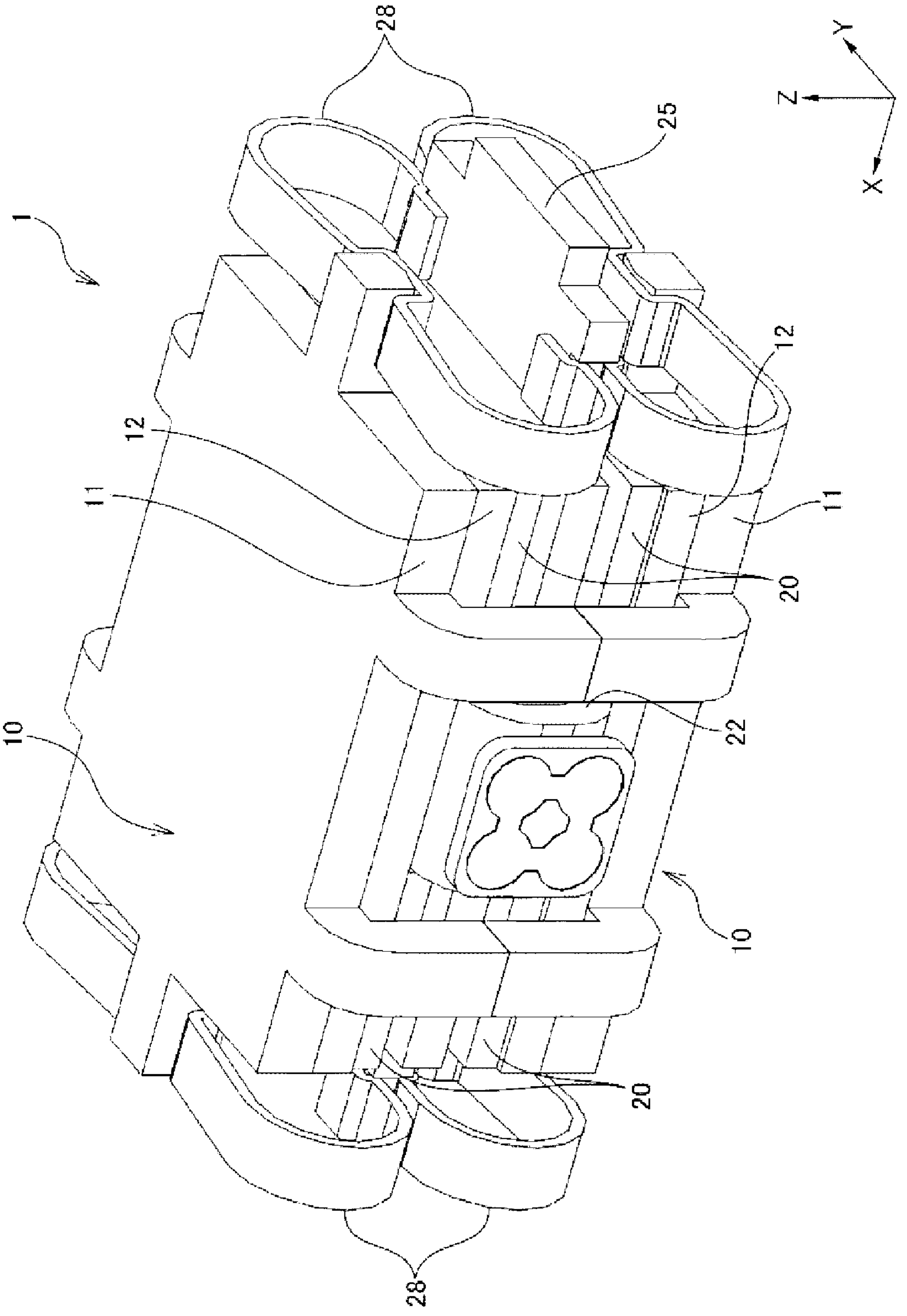
FIG. 5 is a perspective view showing a drive unit of an electromechanical transducer according to a second embodiment.

FIG. 5 is a perspective view showing a drive unit (a drive unit 2) of an electromechanical transducer according to a second embodiment. The drive unit 2 includes a pair of (two) yokes 30, two pairs of (four) magnets 40, a coil 42, an armature 45, and a pair of (two) springs 48. That is, the second embodiment is largely different from the first embodiment in that one pair of springs constituting the drive unit are provided, and accordingly, shapes and sizes of other components (yokes, armature, and the like) are also different from those in the first embodiment.

In the present embodiment, materials used for the yokes, the armature, and the springs are the same as those in the first embodiment. Description of points common to those in the first embodiment will be appropriately omitted.

Each yoke 30 includes an outer yoke 31 constituting an outer portion and an inner yoke 32 constituting an inner portion, and is disposed at a corresponding one of two ends in the Z direction with the outer yoke 31 being an outer side. The coil 42 is fixed to inner sides and central portions in the X direction of the pair of yokes 30 (more precisely, the inner yokes 32). The two pairs of magnets 40 are fixed to the inner sides and end portions in the X direction of the pair of yokes 30 (more precisely, the inner yokes 32). The armature 45 passes through an internal space of a structural portion in which the yokes 30, the magnets 40, and the coil 42 are integrally disposed. The pair of springs 48 are disposed between the structural portion (more precisely, the outer yokes 31) and the armature 45. Further, the end portions of the pair of yokes (more precisely, the inner yokes 32) are fixed to each other to constitute the drive unit 2.

In the second embodiment, since one pair of springs 48 constituting the drive unit is provided, assembly of components is easier than in the case of the first embodiment, and thus the drive unit is suitable for a smaller electromechanical transducer. A configuration of the yoke and a connection relationship between components constituting the drive unit 2 will be described in detail below with reference to other drawings.

Figure 6:
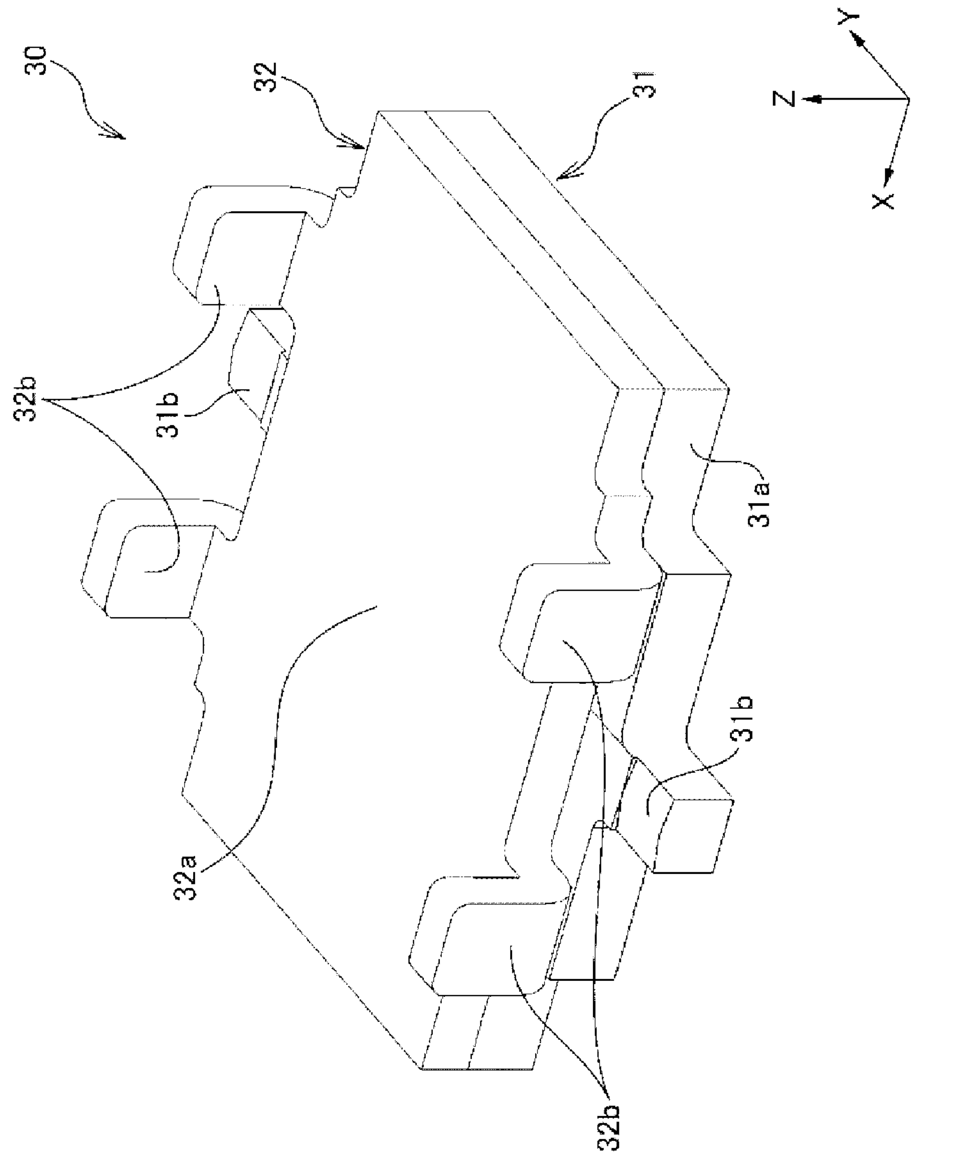
FIG. 6 is a perspective view showing a yoke of the electromechanical transducer according to the second embodiment.

FIG. 6 is a perspective view showing the yoke 30. As described above, the yoke 30 includes the outer yoke 31 and the inner yoke 32, which are pressed against each other and fixed by laser welding or the like.

The outer yoke 31 includes a magnetic flux passage portion 31*a* through which magnetic fluxes pass and spring engagement portions 31*b* that are engaged with the springs 48. The magnetic flux passage portion 31*a* is a substantially flat rectangular portion. The spring engagement portion 31*b* is provided at one location on each of two sides of the magnetic flux passage portion 31*a* in the Y direction, and a surface that is engaged with the spring 48 has a shape that can limit a torque of a force acting on the spring 48 to a small one.

The inner yoke 32 includes a magnetic flux passage portion 32*a* through which magnetic fluxes pass and bent portions 32*b* having end surfaces that fix the pair of yokes 30. The magnetic flux passage portion 32*a* is a substantially flat rectangular portion, and is overlapped with the magnetic flux passage portion 31*a* of the outer yoke 31. The bent portion 32*b* is a portion formed by bending a plate material constituting the magnetic flux passage portion 32a, and is provided at two locations on each of two sides of the magnetic flux passage portion 32a in the Y direction. The bent portion 32b protrudes from two side surfaces of the magnetic flux passage portion 32a in the Y direction, bends into the Z direction, and extends by the same length.

In the present embodiment, the magnetic flux passage portions 31a and 32a are integrated, and a cross-sectional area in the YZ plane thereof is designed with a predetermined size at which magnetic fluxes would not saturate. A thickness of the magnetic flux passage portion 31a is made small within a range in which the spring engagement portion 31b can have a desired strength, and a thickness of the magnetic flux passage portion 32a of the inner yoke 32 compensates for a shortfall in a predetermined thickness. Accordingly, a protruding dimension of the yoke 30 in the Y direction generated by bending the bent portion 32b can be limited to a small value while ensuring the predetermined thickness of the entire yoke 30 and ensuring a sufficient strength for each of the spring engagement portion 31b and the bent portion 32b.

Figure 7:
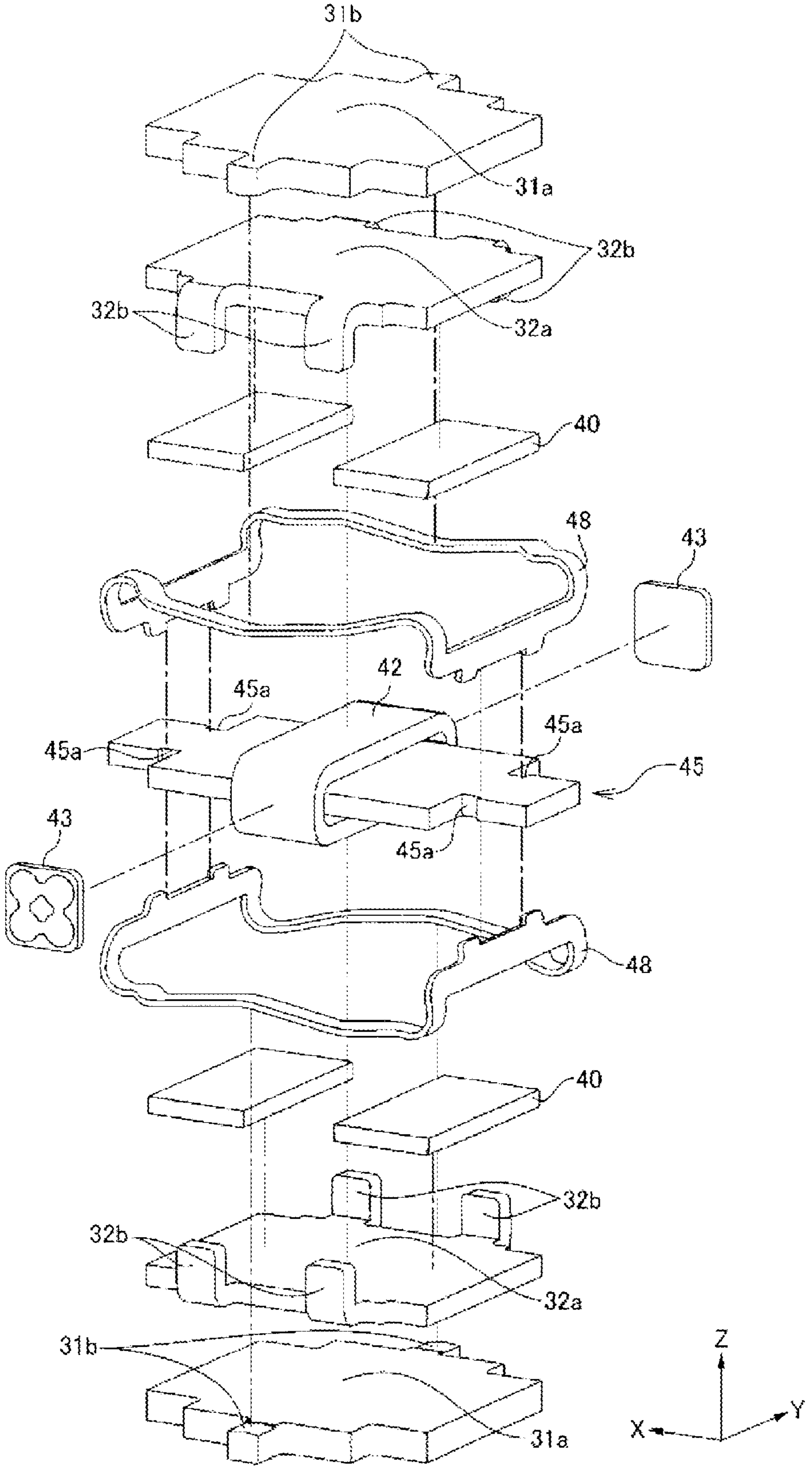
FIG. 7 is an exploded perspective view showing the drive unit of the electromechanical transducer according to the second embodiment.

FIG. 7 is an exploded perspective view showing the drive unit 2. In FIG. 7, to improve the visibility of the drawing and promote understanding of the invention, alternate long and short dash lines indicating the connection between the magnetic flux passage portion 31a of the outer yoke and the magnetic flux passage portion 32a of the inner yoke and the connection between the bent portions 32b of the inner yokes disposed at two end portions in the Z direction are omitted.

The magnetic flux passage portion 31a of the outer yoke and the magnetic flux passage portion 32a of the inner yoke are pressed against each other and fixed by laser welding or the like. The magnets 40 are adhesively fixed to two end portions of the magnetic flux passage portion 32a in the X direction, respectively, and the air core coil 42 is adhesively fixed to a central portion of the magnetic flux passage portion 32a in the X direction. Coil terminals 43 are adhesively fixed to two respective end portions of the coil 42 in the Y direction, and a winding start and a winding end of coil winding are soldered to the coil terminals 43, respectively.

The armature 45 passes through a hole passing in the X direction through the coil 42 constituting a part of the structural portion. The armature 45 is formed with spring engagement portions 45a cut out in a concave shape at two respective end portions in the Y direction slightly inside two ends in the X direction. The pair of springs 48 are disposed between the outer yokes 31 and the armature 45, are engaged with the spring engagement portions 45a of the armature at two end portions in the X direction, and are engaged with the spring engagement portions 31b of the outer yokes at two end portions in the Y direction. Finally, when the four bent portions 32b provided in each of the inner yokes 32 disposed at two end portions in the Z direction are pressed against each other and fixed by laser welding or the like, the drive unit 2 is completed.

In the drive unit 2, the pair of springs 48 are sandwiched between the outer yokes 31 and the armature 45 with a predetermined displacement amount in the Z direction. The armature receives repulsive forces from the pair of springs 48 that are paired in the Z direction, and is held in a position where the repulsive forces are balanced with each other with an appropriate gap between the armature 45 and the structural portion.

Figure 8A:
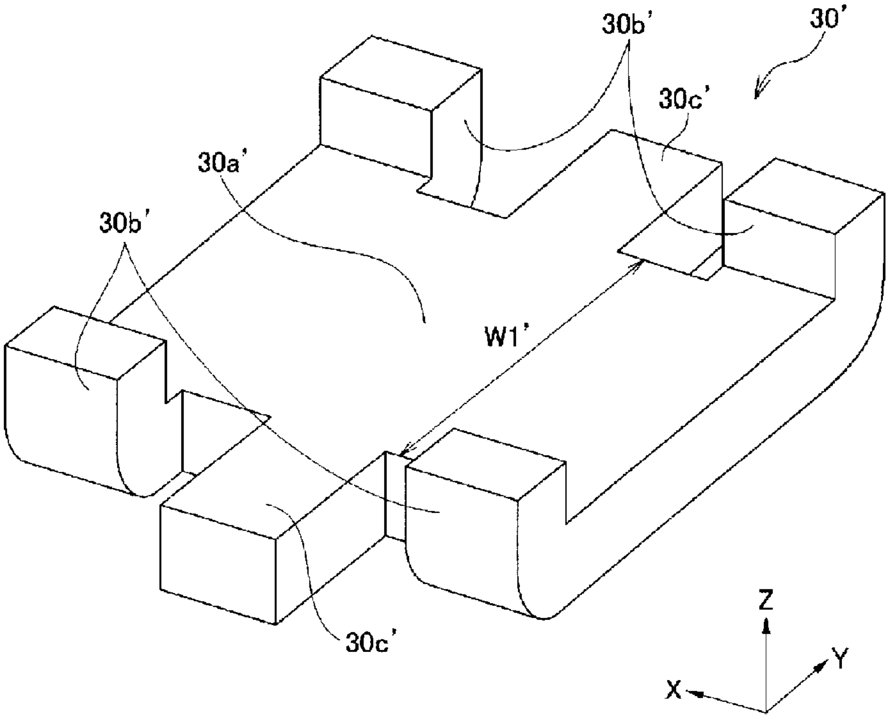
FIG. 8A shows the second embodiment in comparison with a comparative example.
Figure 8B:
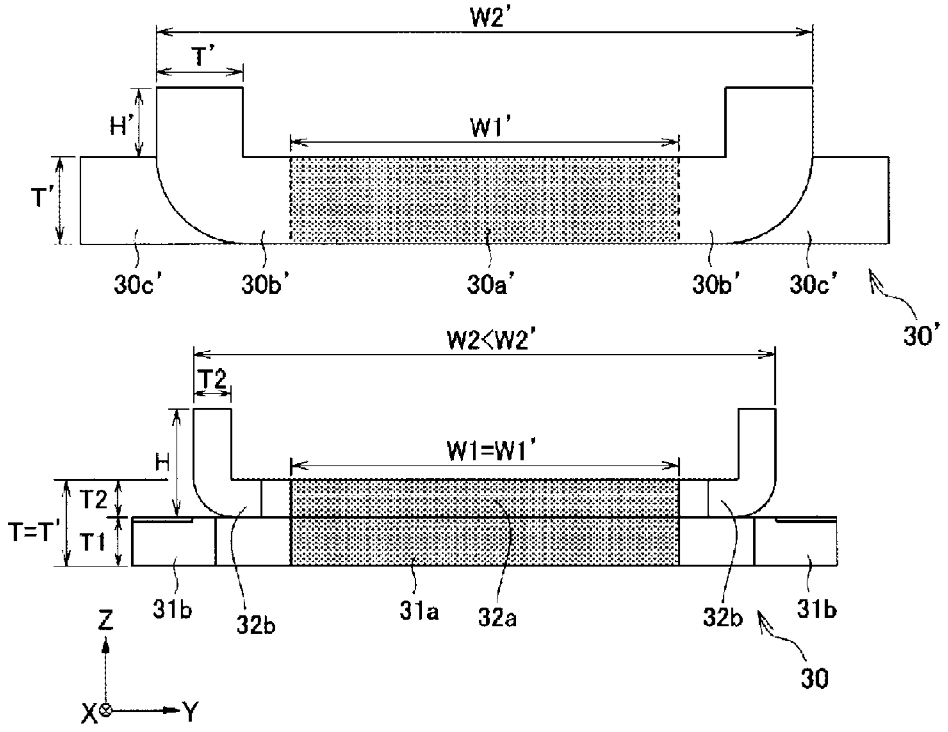
FIG. 8B shows the second embodiment in comparison with the comparative example.

FIGS. 8A and 8B show the second embodiment in comparison with a comparative example. FIG. 8A is a perspective view showing a yoke 30' of an electromechanical transducer as a comparative example, and FIG. 8B is a side view showing the yoke 30' side by side with the yoke 30 of the second embodiment. Reference numerals (W1, W2, H, T, T1, T2, and the like) indicating dimensions of respective portions shown in FIGS. 8A and 8B are not related to the reference numerals shown in FIGS. 4A and 4B at all.

The yoke 30' of the comparative example is intended to ensure a thickness of a magnetic flux passage portion with one component, which is ensured by adding thicknesses of two yoke components (the outer yoke 31, the inner yoke 32) in the yoke 30 of the embodiment. For this reason, the yoke 30' of the comparative example is formed by processing a plate material having a predetermined thickness T', a bent portion 30b' is provided at two locations on each of two sides of a magnetic flux passage portion 30a' in the Y direction, and a spring engagement portion 30c' is provided at one location in a middle position between two bent portions 30b'.

Since the bent portion 30b' is formed by bending the plate material having the thickness T', a dimension in the Y direction at a top portion thereof is equal to the thickness T'. Therefore, although a large strength is ensured in the bent portion 30b', such a strength is not necessary. Although a height H' of a portion of the bent portion 30b' that protrudes upward from the magnetic flux passage portion 30a' is designed with a smaller value than the thickness T', it is fairly difficult to form such a shape. A protruding dimension W2' of the yoke 30' in the Y direction in the position where the bent portion 30b' is provided is a size obtained by adding a dimension required for bending the thickness T' to a dimension W1' of the magnetic flux passage portion 30a' in the Y direction.

In contrast, in the yoke 30 of the second embodiment, the magnetic flux passage portion 31a of the outer yoke constituted by a plate material having the thickness T1 that can impart a desired strength to the spring engagement portion 31b and the magnetic flux passage portion 32a of the inner yoke constituted by a plate material having the thickness T2 are fixed to each other, and the thickness of the magnetic flux passage portion 32a of the inner yoke compensates for a shortfall in the thickness. Although the thickness T2 of the inner yoke 32 is smaller than the thickness T1 of the outer yoke 31, the thickness T2 can also sufficiently ensure the strength necessary for the bent portion 32b. According to the yoke 30, the protruding dimension W2 in the Y direction in the position where the bent portion 32b is provided can be limited to a smaller value by an amount corresponding to a reduction in the thickness T2 of the plate material to be bent ($W2<W2'$) while ensuring a cross-sectional area (a shaded portion in the drawing) of a portion through which magnetic fluxes pass with the same size as that of the yoke 30' of the comparative example ($W1\times T=W1'\times T'$) and ensuring a sufficient strength for each of the spring engagement portion 31b and the bent portion 32b. In addition, the height H of a portion of the bent portion 32b that protrudes upward from the magnetic flux passage portion 32a can be easily designed with a larger value than the thickness T2 of the plate material to be bent, and the bent portion 32b can be easily formed. Therefore, according to the second embodiment, the size of the drive unit and accordingly the size of the electromechanical transducer can be reduced as a whole while mitigating difficulties in manufacturing components.

Third Embodiment

Figure 9:
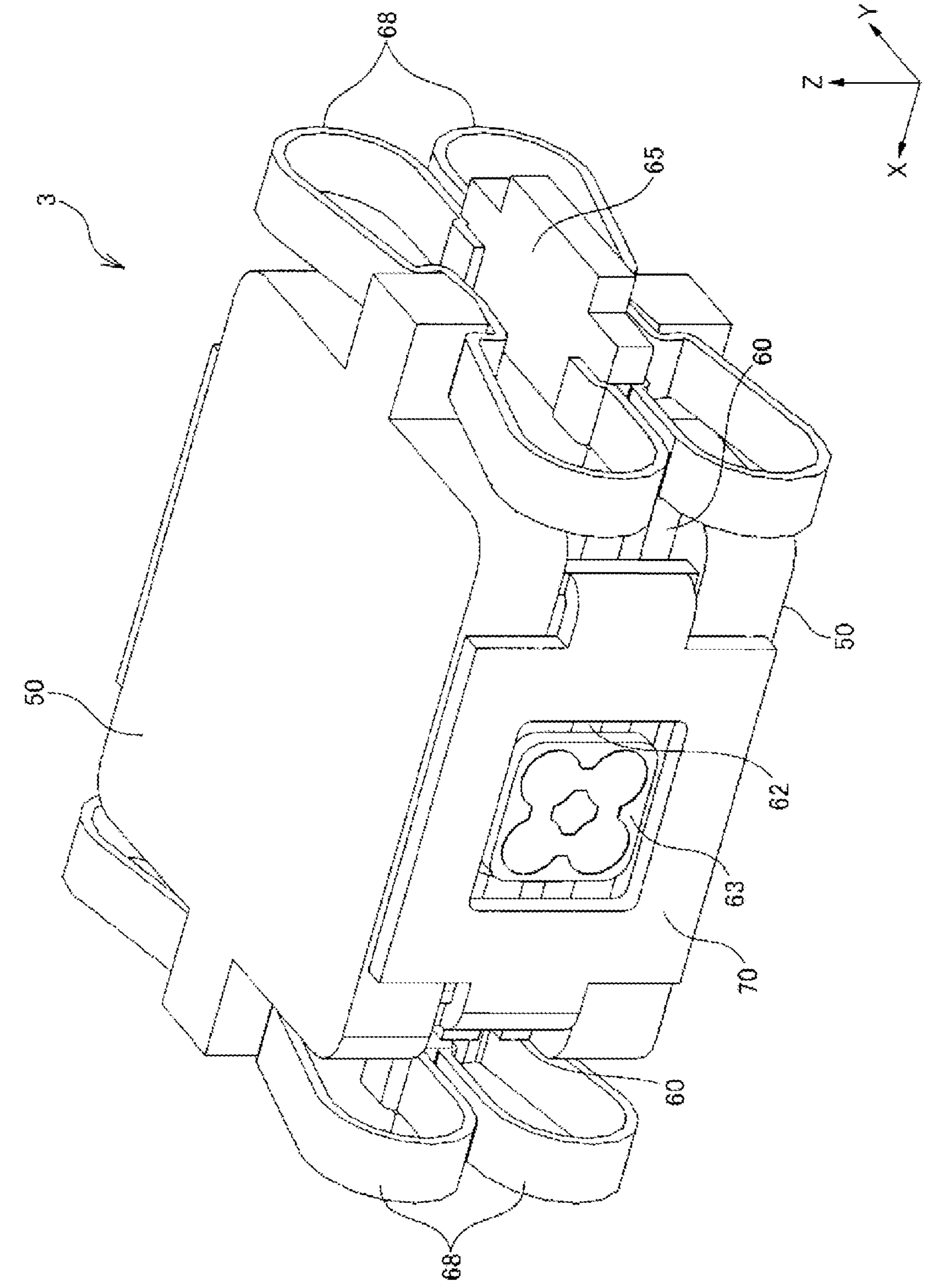
FIG. 9 is a perspective view showing a drive unit of an electromechanical transducer according to a third embodiment.

FIG. 9 is a perspective view showing a drive unit (a drive unit 3) of an electromechanical transducer according to a third embodiment. The drive unit 3 includes a pair of (two)

yokes 50, two pairs of (four) magnets 60 (a part of the magnets 60 that cannot be visually recognized due to an angle are not shown in FIG. 9), a coil 62, an armature 65, two pairs of (four) springs 68, and a pair of (two) side plates 70. Each yoke 50 is constituted by one plate material.

That is, the third embodiment is the same as the first embodiment in that the number of pairs of springs constituting the drive unit is two, and is largely different from the first embodiment in that each yoke 50 is constituted by one plate material and that the pair of side plates 70 are provided. Accordingly, shapes and sizes of other components are also different from those in the first embodiment. Hereinafter, description of points common to those in the first embodiment will be appropriately omitted.

The pair of yokes 50 are disposed at two respective ends in the Z direction. The coil 62 is fixed to inner sides and central portions in the X direction of the pair of yokes 50. The two pairs of magnets 60 are fixed to the inner sides and end portions in the X direction of the pair of yokes 50. The yokes 50, the magnets 60, and the coil 62, which are integrally disposed in this way, as well as the pair of side plates 70 to be described later, constitute a structural portion.

The armature 65 passes through an internal space of the structural portion. The two pairs of springs 68 are disposed between the structural portion (more precisely, the yokes 50) and the armature 65 at two end portions in the X direction. The pair of side plates 70 have a role of positioning and fixing the pair of yokes 50, and are disposed at two ends in the Y direction in a state where coil terminals 63 are exposed from openings thereof. After positions and intervals of the pair of yokes 50 are determined, the pair of side plates 70 are fixed to side surfaces of the yokes 50 in the Y direction. In this way, the armature 65 and the springs 68 are added to the structural portion to constitute the drive unit 3.

In the third embodiment, since the yoke 50 is constituted by one plate material without bending, the yoke can be manufactured more easily than in the case of the first embodiment. A configuration of the side plate 70 and a connection relationship between components of the drive unit 3 will be described in detail below with reference to other drawings.

Figure 10:
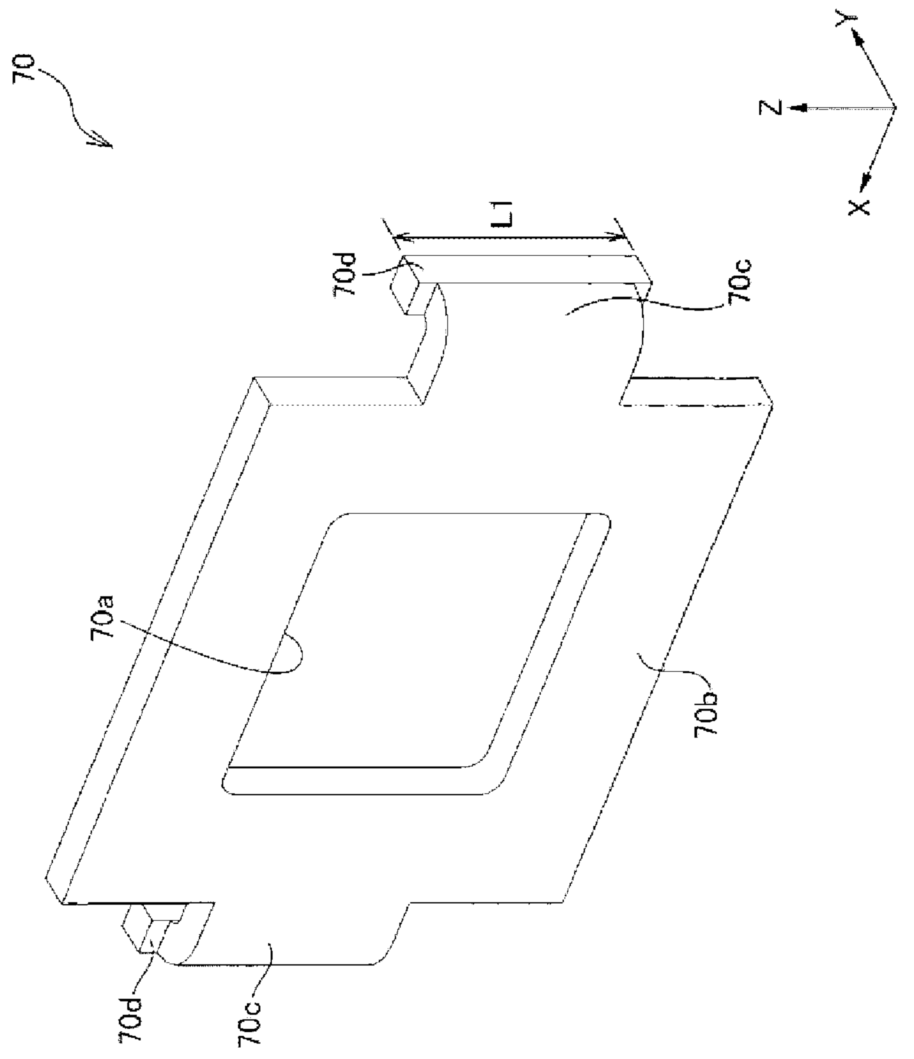
FIG. 10 is a perspective view showing a side plate of the electromechanical transducer according to the third embodiment.

FIG. 10 is a perspective view showing the side plate 70.

The side plate 70 includes an opening 70*a* that is opened at a central portion of the side plate 70 and exposes a coil terminal, a fixing portion 70*b* that surrounds the opening 70*a* and is fixed to the pair of yokes 50, a bent portion 70*c* that is provided at one location in each of symmetrical positions on two sides of the fixing portion 70*b* in the X direction, protrudes from a part of each of two side surfaces of the fixing portion 70*b* in the X direction, and bends into the Y direction, and a spacer portion 70*d* that is provided at an end portion of the bent portion 70*c* in the Y direction, has a predetermined length L1 in the Z direction, determines an interval and positions of the pair of yokes 50, and ensures a space between the pair of yokes 50.

These portions of the side plate 70 are formed by applying various processes to one plate material. A thickness of the side plate 70 is considerably smaller than a thickness of the yoke 50. As a material of the side plate 70, a stainless steel material such as a material SUS301 is used.

Figure 11:
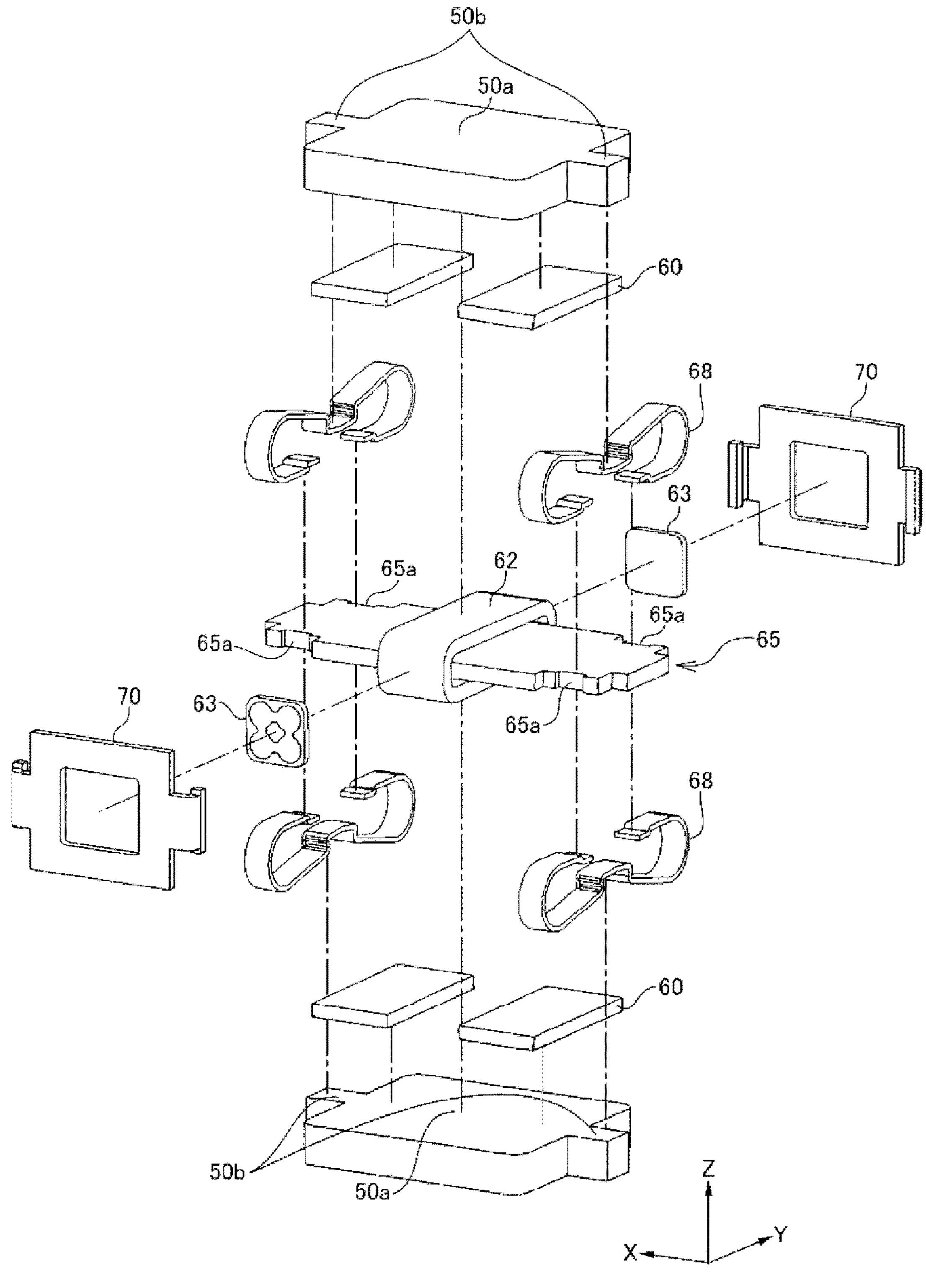
FIG. 11 is an exploded perspective view showing the drive unit of the electromechanical transducer according to the third embodiment.

FIG. 11 is an exploded perspective view showing the drive unit 3. In FIG. 11, to improve the visibility of the drawing and promote understanding of the invention, alternate long and short dash lines indicating the connection between the side plate 70 and the yoke 50 are omitted. Reference numerals, which are not shown to improve visibility, refer to FIGS. 9 and 10 appropriately.

The yoke 50 is constituted by one plate material, and includes a magnetic flux passage portion 50*a* having a substantially flat rectangular shape through which magnetic fluxes pass, and a spring engagement portion 50*b* that is formed at one location at a central portion of each of two ends of the magnetic flux passage portion 50*a* in the X direction and is engaged with the spring 68. The magnets 60 are adhesively fixed to two end portions of the magnetic flux passage portion 50*a* in the X direction, respectively, and the air core coil 62 is adhesively fixed to a central portion of the magnetic flux passage portion 50*a* in the X direction. The coil terminals 63 are adhesively fixed to two respective end portions of the coil 62 in the Y direction, and a winding start and a winding end of coil winding are soldered to the coil terminals 63, respectively.

The armature 65 passes through a hole passing in the X direction through the coil 62 constituting a part of the structural portion. The armature 65 is formed with spring engagement portions 65*a* cut out in a concave shape at two respective end portions in the Y direction slightly inside two ends in the X direction. The two pairs of springs 68 are disposed between the yokes 50 and the armature 65 at two end portions in the X direction, and are engaged with the spring engagement portions 50*b* and 65*a* of the yokes 50 and the armature 65.

The side plates 70 are disposed from two sides of the yokes 50, the magnets 60, and the coil 62 that are integrally disposed in the Y direction. The side plates 70 are disposed such that the coil terminals 63 are exposed from the openings 70*a* first, and the spacer portions 70*d* are inserted between the pair of yokes 50 and are aligned with predetermined positions of the magnetic flux passage portions 50*a*. Accordingly, an interval of a predetermined size is maintained between the two yokes 50. When the fixing portions 70*b* are fixed to side surfaces of the magnetic flux passage portions 50*a* by laser welding or the like, the drive unit 3 is completed.

Fourth Embodiment

Figure 12:
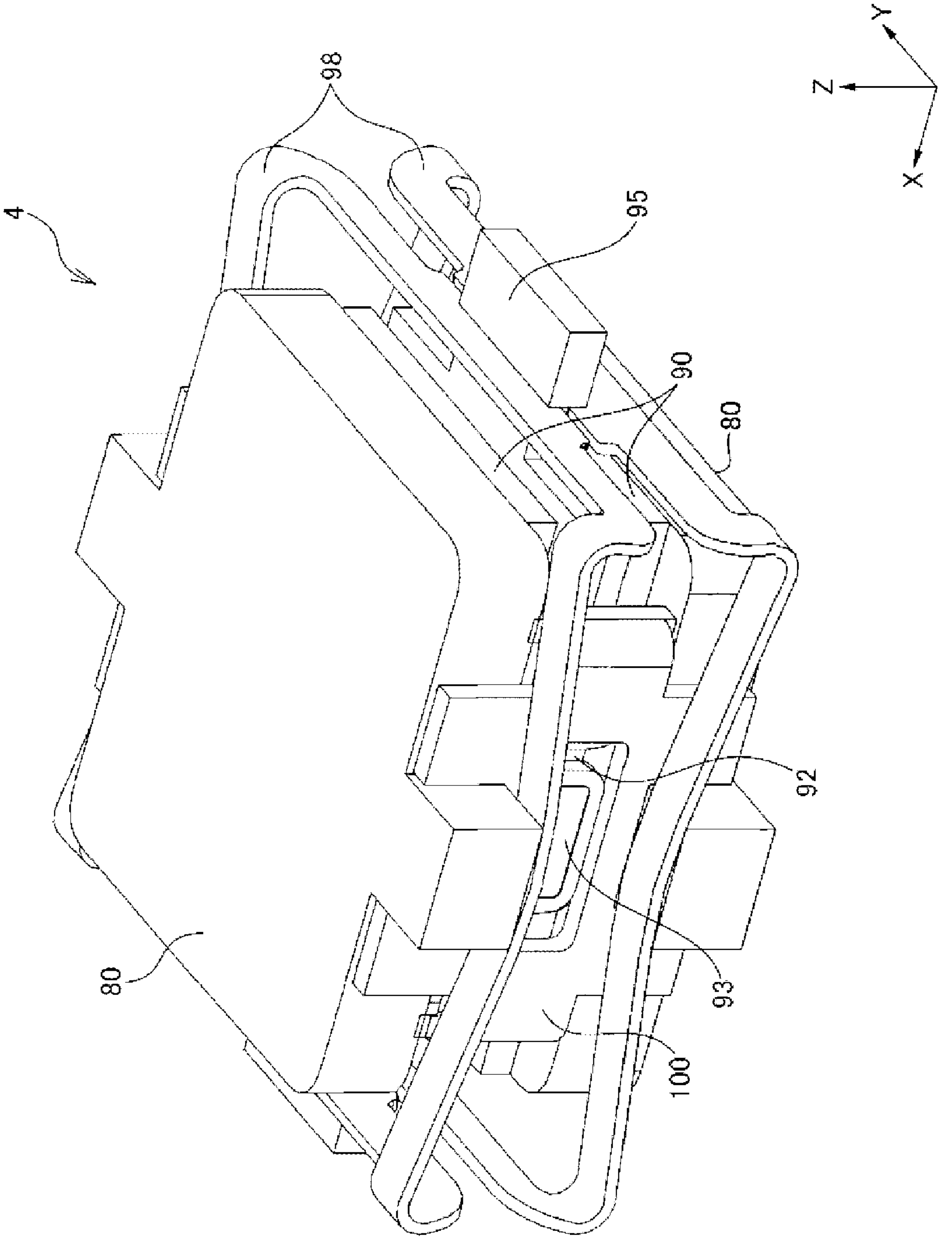
FIG. 12 is a perspective view showing a drive unit of an electromechanical transducer according to a fourth embodiment.

FIG. 12 is a perspective view showing a drive unit (a drive unit 4) of an electromechanical transducer according to a fourth embodiment. The drive unit 4 includes a pair of (two) yokes 80, two pairs of (four) magnets 90 (a part of the magnets 90 that cannot be visually recognized due to an angle are not shown in FIG. 12), a coil 92, an armature 95, a pair of (two) springs 98, and a pair of (two) side plates 100. Each yoke 80 is constituted by one plate material.

That is, the fourth embodiment is the same as the second embodiment in that the number of springs constituting the drive unit is one, and is largely different from the second embodiment in that each yoke is constituted by one plate material and that the pair of side plates are provided. Accordingly, shapes and sizes of other components are also different from those in the second embodiment. The fourth embodiment is the same as the third embodiment in that each yoke is constituted by one plate material and that the pair of side plates are provided, and is largely different from the third embodiment in that the number of springs constituting the drive unit is one. Hereinafter, description of points common to those in the second embodiment and the third embodiment will be appropriately omitted.

The pair of yokes 80 are disposed at two respective ends in the Z direction. The coil 92 is fixed to inner sides and central portions in the X direction of the pair of yokes 80. The two pairs of magnets 90 are fixed to the inner sides and end portions in the X direction of the pair of yokes 80. The yokes 80, the magnets 90, and the coil 92, which are integrally disposed in this way, as well as the pair of side plates 100 to be described later, constitute a structural portion.

The armature 95 passes through an internal space of the structural portion. The pair of springs 98 are disposed between the structural portion (more precisely, the yokes 80) and the armature 95. The pair of side plates 100 have a role of positioning and fixing the pair of yokes 80, and are disposed at two ends in the Y direction in a state where coil terminals 93 are exposed from openings thereof. After positions and intervals of the pair of yokes 80 are determined, the pair of side plates 100 are fixed to side surfaces of the yokes 80 in the Y direction. In this way, the armature 95 and the springs 98 are added to the structural portion to constitute the drive unit 4.

In the fourth embodiment, since the yoke 80 is constituted by one plate material without bending, the yoke can be manufactured more easily than in the case of the second embodiment. Further, since one pair of springs 98 constituting the drive unit are provided, assembly of the structural portion is easier than in the case of the third embodiment, and thus the drive unit is suitable for a smaller electromechanical transducer. A configuration of the side plate 100 and a connection relationship between components constituting the drive unit 4 will be described in below later with reference to other drawings.

Figure 13:
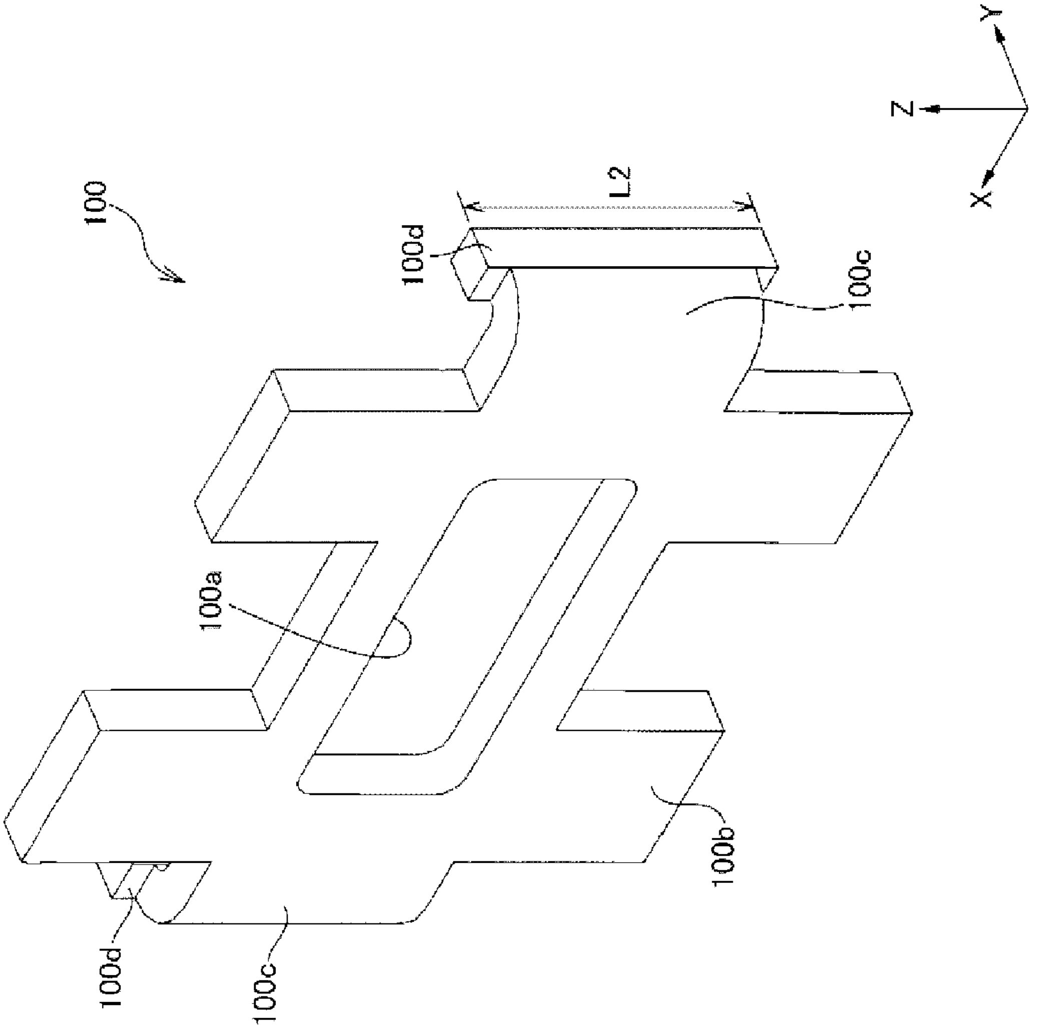
FIG. 13 is a perspective view showing a side plate of the electromechanical transducer according to the fourth embodiment.

FIG. 13 is a perspective view showing the side plate 100.

The side plate 100 includes an opening 100*a* that is opened at a central portion of the side plate 100 and exposes a coil terminal, a fixing portion 100*b* that surrounds the opening 100*a* and is formed by cutting out one location at a central portion of the side plate 100 on each of two sides in the Z direction in a concave shape to fix the side plate 100 to the pair of yokes 80, a bent portion 100*c* that is provided at one location in each of symmetrical positions on two sides of the fixing portion 100*b* in the X direction, protrudes from a part of each of two side surfaces of the fixing portion 100*b* in the X direction, and bends into the Y direction, and a spacer portion 100*d* that has a predetermined length L2 in the Z direction, is provided at an end portion of the bent portion 100*c* in the Y direction, determines an interval and positions of the pair of yokes 80, and ensures a space between the pair of yokes 80. The cutout formed in the fixing portion 100*b* is for receiving a spring engagement portion protruding from the yoke 80 in the Y direction.

These portions of the side plate 100 are formed by applying various processes to one plate material. A thickness of the side plate 100 is considerably smaller than a thickness of the yoke 80.

Figure 14:
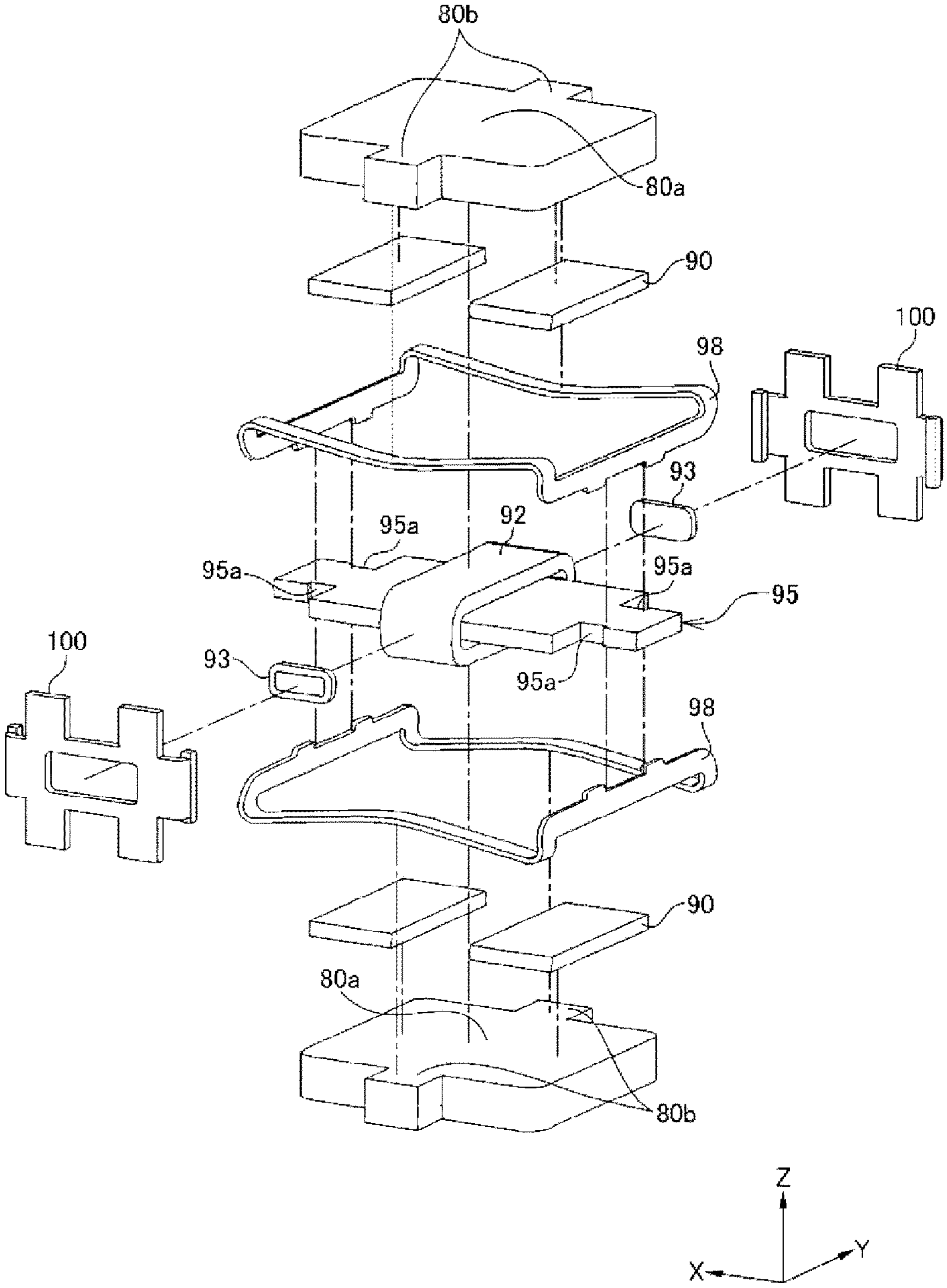
FIG. 14 is an exploded perspective view of the drive unit of the electromechanical transducer according to the fourth embodiment.

FIG. 14 is an exploded perspective view showing the drive unit 4. In FIG. 14, to improve the visibility of the drawing and promote understanding of the invention, alternate long and short dash lines indicating the connection between the side plate 100 and the yoke 80 are omitted. Reference numerals, which are not shown to improve visibility, refer to FIGS. 12 and 13 appropriately.

The yoke 80 is constituted by one plate material, and includes a magnetic flux passage portion 80*a* having a substantially flat rectangular shape through which magnetic fluxes pass, and a spring engagement portion 80*b* that is formed at one location at a central portion of each of two ends of the magnetic flux passage portion 80*a* in the Y direction and is engaged with the spring 98. The magnets 90 are adhesively fixed to two end portions of the magnetic flux passage portion 80*a* in the X direction, respectively, and the air core coil 92 is adhesively fixed to a central portion of the magnetic flux passage portion 80*a* in the X direction. The coil terminals 93 are adhesively fixed to two respective end portions of the coil 92 in the Y direction, and a winding start and a winding end of coil winding are soldered to the coil terminals 93, respectively.

The side plates 100 are disposed from two sides of the yokes 80, the magnets 90, and the coil 92 that are integrally disposed in the Y direction. The side plates 100 are disposed such that the coil terminals 93 are exposed from the openings 100*a* first while the spring engagement portions 80*b* of the yokes are received by the concave cutouts, and the spacer portions 100*d* are inserted between the pair of yokes 80 and are aligned predetermined positions of the magnetic flux passage portions 80*a*. Accordingly, an interval of a predetermined size is maintained between the two yokes 80.

The armature 95 passes through a hole passing in the X direction through the coil 92 constituting a part of the structural portion. The armature 95 is formed with spring engagement portions 95*a* cut out in a concave shape at two respective end portions in the Y direction slightly inside two ends in the X direction. The pair of springs 98 are disposed between the yokes 80 and the armature 95, are engaged with the spring engagement portions 95*a* of the armature at two end portions in the X direction, and are engaged with the spring engagement portions 80*b* of the yokes at two end portions in the Y direction. When the fixing portions 100*b* of the side plates are fixed to side surfaces of the magnetic flux passage portions 80*a* by laser welding or the like, the drive unit 4 is completed.

Advantages of Embodiments

The first embodiment and the third embodiment correspond to an electromechanical transducer in which two pairs of springs constitute a drive unit, and the second embodiment and the fourth embodiment correspond to an electromechanical transducer in which one pair of springs constitute a drive unit. Among these, in the first embodiment and the second embodiment, a yoke is constituted by two plate materials (includes two yoke components), and bent portions each formed by bending only one plate material (a plate material thinner than the yoke) are fixed to each other, so that the manufacturing of components is facilitated and the size of the entire drive unit is limited. In contrast, in the third embodiment and the fourth embodiment, a yoke is constituted by one plate material without bending, and a pair of yokes are fixed by a pair of side plates each formed by bending a plate material thinner than the yoke, so that the manufacturing of components is facilitated and the size of the entire drive unit is limited. In this way, although the four embodiments have different structures, all the embodiments are common in that a pair of yokes are fixed by a component that includes a bent portion and is constituted by a plate material thinner than the yoke.

As described above, according to the embodiments, the following effects can be obtained.

(1) According to the four embodiments, a pair of yokes are fixed by a portion constituted by a plate material thinner than the yoke. Accordingly, a component including the portion can be easily manufactured as compared with a case where the component is constituted by a plate material having the same thickness as the yoke. Further, when the portion is formed by bending the component, a protruding dimension of the component at a portion protruding by bending is limited to a small value as compared with a case where the portion is formed by bending a plate material having the same thickness as the yoke, and thus a size of a drive unit and accordingly a size of an electromechanical transducer can be reduced.

(2) According to the first embodiment and the second embodiment, each of a pair of yokes is formed by integrating two yoke components (an outer yoke and an inner yoke). One of the two yoke components has such a thickness that a spring engagement portion on which a repulsive force of a spring acts at all times can have a desired strength. The other one of the two yoke components has a thickness that compensates for a shortfall in a thickness for ensuring a predetermined cross-sectional area at which magnetic fluxes passing through the yoke would not saturate. For this reason, a predetermined thickness of the entire yoke can be ensured. Accordingly, yoke components can be easily manufactured, and the protruding dimension of the yoke at the portion protruding by bending can be limited to a small value. As a result, a size of a drive unit and accordingly a size of an electromechanical transducer can be reduced.

(3) According to the third embodiment and the fourth embodiment, a yoke is constituted by one plate material without bending, and accordingly the yoke can be easily manufactured. Further, a pair of side plates for positioning and fixing the yoke are formed by applying various processes to a plate material thinner than the yoke, and accordingly, the side plates can be easily manufactured with a minimum necessary size. As a result, a size of a drive unit and accordingly a size of an electromechanical transducer can be reduced.

The present invention is not limited to the above-described embodiments, and various modifications can be made.

In the second embodiment, the spring engagement portion 31*b* is provided on the outer yoke 31, and the bent portion 32*b* is provided on the inner yoke 32. Alternatively, the spring engagement portion and the bent portion may be provided on the same yoke component. For example, the spring engagement portion and the bent portion may be provided on the outer yoke. With such a configuration, the inner yoke has substantially the same shape as a shape of a magnetic flux passage portion of the outer yoke.

As the springs 28, 48, 68, and 98 in the above-described embodiments, an elastic member other than a leaf spring may be used as long as a restoring force corresponding to the displacement is applied to an armature that is displaced by a magnetic force of a magnet.

The drive units 1, 2, 3, and 4 in the embodiments described above may be applied to applications other than an electromechanical transducer. For example, the drive unit can be used as a part of an electroacoustic transducer that converts electric vibration into sound and outputs the sound to the outside.

In addition, materials, numerical values, and the like described as examples of components of the drive units 1, 2, 3, and 4 are merely examples, and it is needless to say that modifications can be appropriately made in implementing the present invention.

The present application is based on Japanese Patent Application No. 2020-152715 filed on Sep. 11, 2020, and the contents thereof are incorporated herein as reference.

REFERENCE SIGNS LIST

1, 2, 3, 4 driver unit
10, 30, 50, 80 yoke
11, 31 outer yoke
12, 32 inner yoke
20, 40, 60, 90 magnet
22, 42, 62, 92 coil
23, 43, 63, 93 coil terminal
25, 45, 65, 95 armature
28, 48, 68, 98 spring
70, 100 side plate

The invention claimed is:

1. An electromechanical transducer comprising:
a pair of magnets;
a pair of yokes, each of which includes plural yoke components that are overlapped with each other at flat plate-shaped portions thereof, the yokes configured to guide magnetic fluxes generated by the magnets;
an air core coil to which an electric signal is supplied;
an armature passing through an internal space of a structural portion in which the magnets and the coil are integrally disposed inside the yokes; and
a pair of elastic members, each of which is engaged with the structural portion and the armature,
wherein each of the yokes includes, on one of the yoke components, bent portions protruding from respective symmetrical positions of two side surfaces thereof in a predetermined second direction orthogonal to a first direction that is an overlapping direction of the yoke components, bend into the first direction, and extend by a predetermined length,
wherein the yokes are fixed to each other on end surfaces of the bent portions,
wherein said each of the yokes further includes engagement portions protruding from predetermined positions on the two side surfaces of the yoke component disposed on an outer side of the structural portion in a direction orthogonal to the first direction, and
wherein the elastic members are engaged with the engagement portions.

* * * * *